Aug. 5, 1958  F. MOORE  2,845,942
AUTOMATIC TWO DIMENSIONAL TRACER
Filed June 25, 1954  2 Sheets-Sheet 1

INVENTOR.
FRANK MOORE
BY
Robert G. Sloman
ATTORNEY.

Aug. 5, 1958         F. MOORE         2,845,942
AUTOMATIC TWO DIMENSIONAL TRACER
Filed June 25, 1954         2 Sheets-Sheet 2

INVENTOR.
FRANK MOORE
BY
Robert C. Sloman
ATTORNEY.

United States Patent Office 2,845,942
Patented Aug. 5, 1958

2,845,942
AUTOMATIC TWO DIMENSIONAL TRACER

Frank Moore, Detroit, Mich., assignor to Manuel Turchan, doing business as Turchan Follower Machine Company, Detroit, Mich.

Application June 25, 1954, Serial No. 439,291

4 Claims. (Cl. 137—330)

This invention relates to a contour duplicating tracer, and more particularly to an automatic two dimensional tracer movable over and responsive to variations in the profile of a template for controlling the flow of pressure fluid to a pair of right angularly related slide controlling cylinders for thereby effecting relative feed movements between a cutter and a workpiece and said tracer and template for thereby reproducing in said workpiece by a continuous operation, the contour of said template.

It is the object of the present invention to provide a novel tracer construction wherein the tracer spindle is continuously rotated, and which rotation upon frictional cooperation with the template determines the direction of tilting movement of the tracer spindle.

It is the further object of the present invention to provide a magnetic type of tracer spindle whereby the tracer contactor adheres to the profile of the template as it moves thereover, and in responding to the said profile receives lateral thrusts.

It is the further object of the present invention to provide in a tracer mechanism of this type a universally mounted spindle together with a pair of fluid control valves whose longitudinal movements are controlled by tilting movements of said spindle.

It is the further object of the present invention to provide a novel spindle mounting and spindle construction whereby said spindle is not only continuously rotatable under power but is also universally tiltable throughout 360 degrees.

It is the further object of the present invention to provide a remote electric control for the tracer spindle whereby upon the manual use of such control longitudinal relative feed movements and relative feed movements at a 45 degree angle may be effected.

These and other objects will be seen from the following specification and claims in conjunction with the appended drawings, in which:

It will be understood that the above drawings illustrate merely a preferred embodiment of the invention, and that other embodiments are contemplated within the scope of the claims hereafter set forth.

Figures 1, 3:
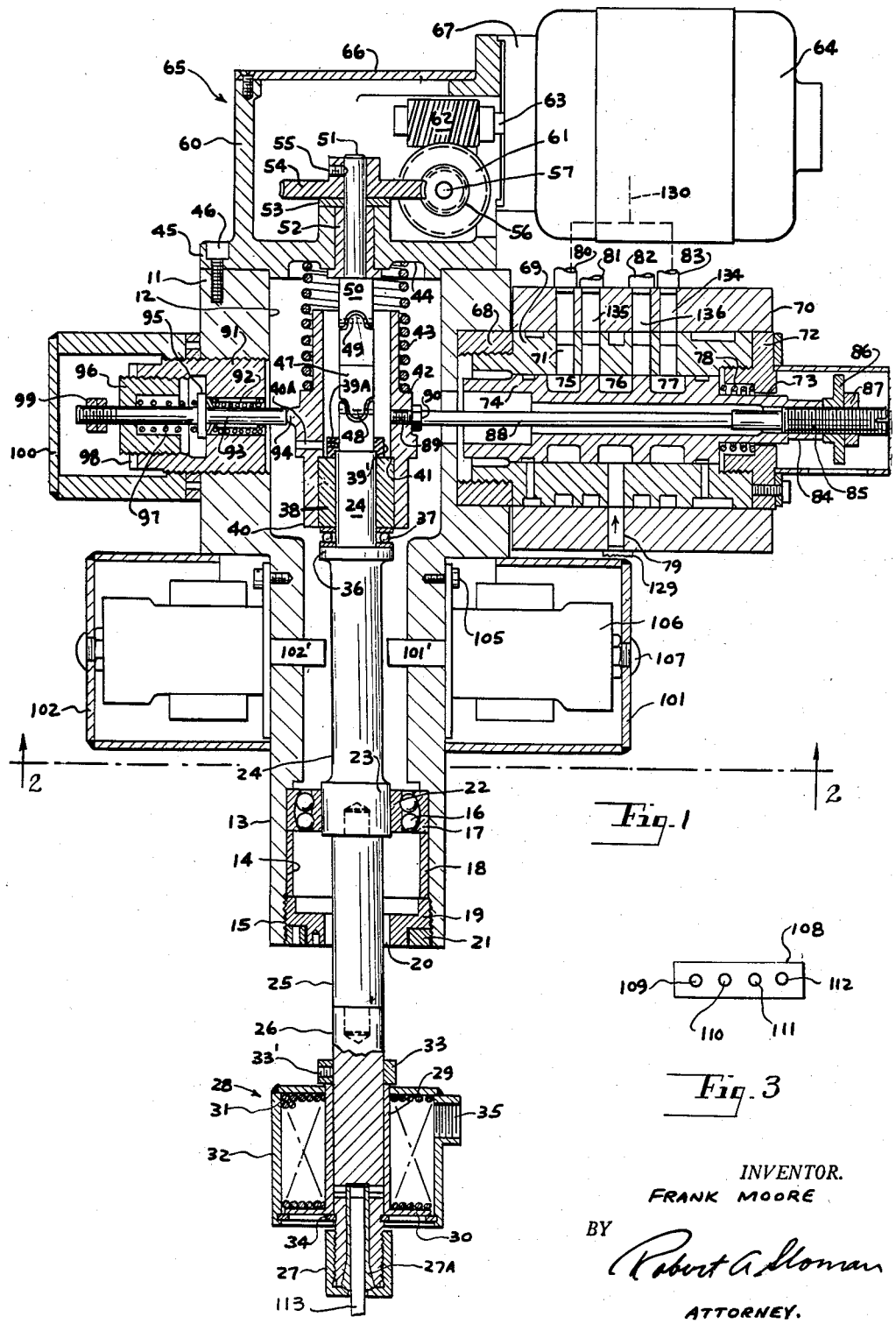
Fig. 1 is an elevational section of the present tracer.
Fig. 3 is a diagrammatic illustration of a remote control panel.

Referring to Fig. 1 of the drawings, the tracer includes block 11 with bore 12, said block terminating in the depending tracer barrel 13 with bore 14 and which is interiorly threaded at 15 at its lower end for receiving screw 19 and lock nut 21.

Ball bearings 16 are mounted within race 17 and have a central support 22 within which is slidably positioned shoulder 23 of spindle 24, which in the present preferred embodiment is in an upright position and extends axially of the tracer block and barrel. By virtue of the ball bearing assembly 16, 17 and 22, the spindle is adapted for universal tilting movements. A portion of the spindle depends from the lower end of barrel 13 through the adjusting nut 19 and its enlarged aperture 20. Nut 19 adjustably retains support 18 for bearing race 17.

Spindle 24 below its shoulder 23 has a depending extension 25 of brass, which is magnetically non-conductive for preventing magnetizing of spindle element 24. Spindle element 26 forming an extension of spindle 24 depends from spindle element 25 and has collet 27A and collet nut 27 at its lower end, which supportably receives contactor pin 113 adapted to engage the profile of a template.

An electromagnetic coil is generally indicated at 28 mounted adjacent the lower end of the spindle and includes the cylindrically shaped brass liner 29 with bottom supporting flange 30, which is secured upon the spindle by the split ring 34, Fig. 1. The D. C. coil 31 is concentrically arranged upon and around brass liner 29—30 and within the iron case 32 which is retained at its upper end upon said spindle by the collar 33 with set screw 33', said case having an inlet 35 to permit introduction of a suitable direct current carrying wire for energizing coil 31.

Towards the upper end of spindle 24 there is an enlarged shoulder 36 which terminates in an extension of said spindle, which is of less diameter, said shoulder carrying thrust bearing 37 upon which brass bushing 38 rests. Collar 39', held in position on spindle 24 by set screw 39A and accessible through hole 40A, prevents brass bushing 38 and therefore valve operator 40 from being forced off of spindle 24.

Said operator also has an exterior cylindrical portion of reduced outside diameter defining the annular shoulder 42 supportably receiving the lower end of coiled spring 43. The upper end of said spring is positioned within the annular recess 44 formed in the undersurface of tracer cover 45, which surface acts as a stop for said spring whereby the spring is normally urging the valve operator axially downward, and through bushing 38 correspondingly urges the spindle 24 axially downward, said spindle being free to rotate with respect to bushing 38 and thrust bearings 37 by operation of the D. C. motor 64 secured to the tracer by the mounting plate 67 at the upper end of Fig. 1.

The cap is secured to the tracer block by the screws 46 and has a central apertured formation which projects upwardly and receives bushing 52 within which is journaled shaft 51, which at its lower end has an enlargement 50 which bears against the undersurface of said bushing. Said enlargement has secured thereto at its lower end universal joint 49 connecting cylindrical spindle extension 47. This extension at its lower end is connected by a second universal joint 48 to the upper end of spindle 24, whereby said spindle though universally tiltable, is adapted for continuous rotation in one direction or the other.

The thrust bushing or plate 53 is positioned at the upper end of bushing 52 and rotatably positioned thereover is the worm wheel 54 secured to shaft 51 by the set screw 55, and in mesh with worm gear 56 suitably secured to driven shaft 57.

Said shaft is journaled in a horizontal position in the preferred embodiment of the invention within bushings supported within transverse openings in the hollow reduction gear casing 60 which forms a part of tracer cover 45. Worm wheel 61 is also secured upon driven shaft 57 and is in mesh with worm gear 62 upon power output shaft 63 of motor 64, said reduction gear being generally indicated at 65 in Fig. 1 and including the removable cover 66. Motor 64 is suitably secured to gear casing 65 as by the circular plate 67.

Figure 2:
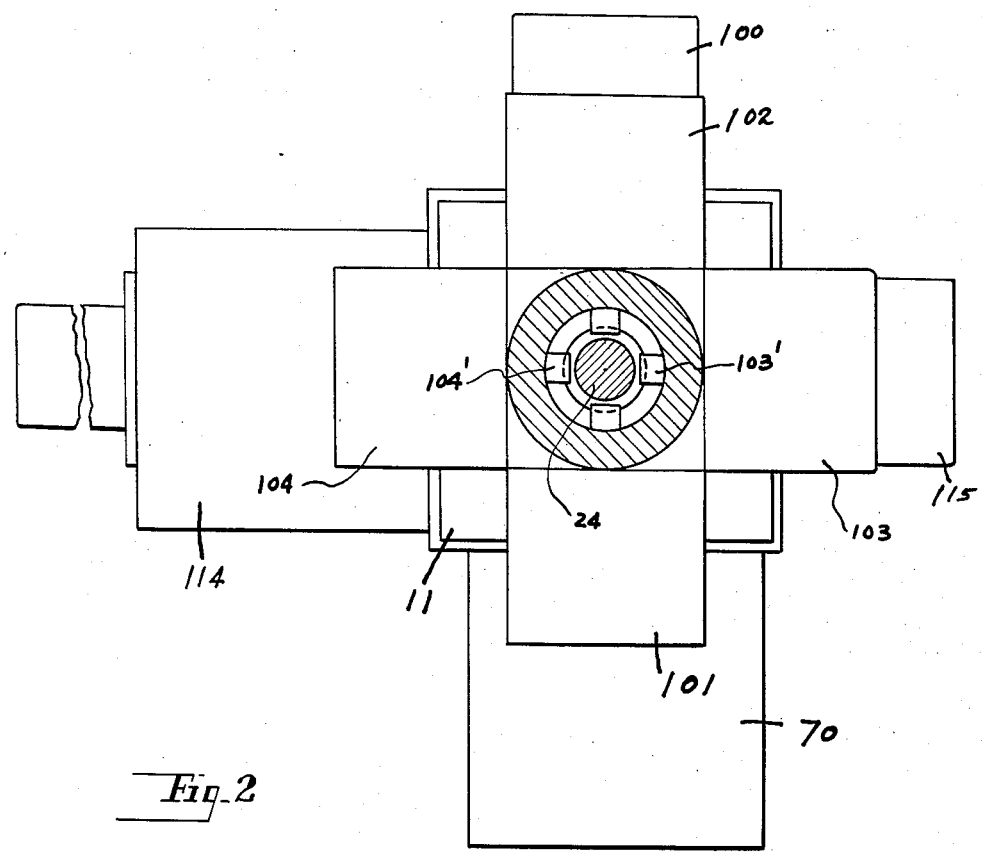
Fig. 2 is a section taken on line 2—2 of Fig. 1.

The tracer block 11, which in the preferred embodiment is in an upright position, has secured thereto and laterally extending therefrom and at right angles to each other a pair of valve bodies 70 and 114, Fig. 2, whose longitudinal axes are at right angles to the spindle axis as well as the longitudinal axis of the tracer.

Within each of said valve bodies there is provided a suitable ported valve sleeve 69 of cylindrical form and longitudinally reciprocal within each sleeve is a fluid control valve spool, such as shown in Fig. 1 at 74. The fluid control valve spool in each case is directly connected to the valve actuator 40 by a tie bar, such as tie bar 88, whereby universal adjustments of the tracer spindle will effect control movements of one or both of the right angularly related fluid control valve spools which are adapted for directing pressure fluid to one end or the other of a pair of right angularly related hydraulic cylinders.

Pressure fluid delivered to valve body 70 in accordance with the control movements of valve spool 74 hereafter described, will deliver pressure fluid through either of the conduits 81 or 82 adapted for connection to one end or the other of a hydraulic cylinder for effecting longitudinal movement thereof in one direction or the other. If pressure fluid is delivered through conduit 81, then exhaust fluid from the opposite end of such cylinder returns to the valve body 70 through conduit 82. On the other hand, if pressure fluid is delivered through conduit 82 to the cylinder, exhaust returns through conduit 81.

Similarly, pressure fluid delivered to valve body 114 will be delivered, depending upon the controlled positioning of its valve, through either of a pair of conduits similar to conduits 81 or 82 adapted for connection to opposite ends of a second cylinder with the other of the two conduits, receiving the exhaust flow back from the cylinder.

As the valve mechanisms within each of the valve bodies are identical, only one thereof will be described as in Fig. 1. Referring to Fig. 1, tracer block 11 has a transverse circular opening in communication with bore 12 within which is secured ring 68 and which is interiorly threaded for adjustably receiving the threaded extension of valve sleeve 69 secured within valve body 70.

Positioned within the outer end of valve body 70 is cap 72 centrally apertured at 73, and with a portion of said cap threaded into the outer end of sleeve 69.

Longitudinally reciprocal valve spool 74 having a longitudinal bore throughout its length is slidably positioned within said sleeve and has formed in its exterior surface a series of longitudinally spaced annular passages 75, 76 and 77. Coiled spring 78 loosely surrounds the reduced outer end of said valve spool and is interposed between cap 72 and valve spool 74, normally urging said valve spool axially inward toward valve operator 40. Transverse passageway 79 formed through said valve body and sleeve, communicates at its inner end with valve opening 76, and at its outer end is connected with pressure fluid supply conduit 129.

As shown in Fig. 1, there is also provided through said valve body and sleeve a series of passageways 71 and 134, whose inner ends are respectively in communication with valve passages 75 and 77, and whose outer ends have connected therewith conduits 80 and 83. These conduits are exhaust conduits, and both are connected to return exhaust conduit 130 which is adapted for delivery of exhaust fluid from one end or the other of one cylinder to a hydraulic unit.

There are also provided an additional pair of passages 135 and 136, whose inner ends in the neutral position of valve spool 74 of Fig. 1, are closed off by portions of the valve spool adjacent passages 75, 76 and 77. The outer ends of passages 135 and 136 respectively connect with conduits 81 and 82.

Should valve spool 74 be moved to the left a short distance, such as from .002 to .007 inch for illustration, then valve passage 76 will communicate with passage 135 and pressure fluid will be delivered through conduit 81 to the left end of said first cylinder causing the cylinder to move to the left, for example. At the same time, exhaust fluid returns through conduit 82 and through passage 136 then communicating with valve passage 77. This exhaust fluid then moves through passage 134 and exhaust conduits 83 and 130.

Should valve spool 74 move slightly to the right of the position shown in Fig. 1, then the pressure fluid in valve passage 76 communicates with passage 136 and conduit 82 to said cylinder; and exhaust returns through conduit 81, passage 135 and valve passage 75 and thence through passage 71 and exhaust conduits 80 and 130.

Referring again to the valve structure of Fig. 1, there is loosely positioned within the bore of valve spool 74, tie bar 88 whose outer enlarged threaded end 85 threadedly engages valve extension 84. Disc 86 is positioned upon tie bar element 85 and is secured thereon by the lock nut 87, which at the same time immovably secures tie bar 88 with respect to valve spool 74.

The threaded inner end of tie bar 88 extends through an aperture in the valve block 11 and is secured as at 89 to valve actuator 40, there being a suitable lock nut 90 employed.

This identical construction is repeated within the valve body 114 so that there is provided a pair of right angularly related fluid control valves joined by tie bars to valve actuator 40 and with the connections therewith being arranged at 90 degrees with respect to each other. Thus, universal tilting movements of the spindle as its contactor 113 traverses over a profile of a template will control the simultaneous operation of both valves or either valve.

Referring to Fig. 1, there is provided a balancing stop construction, which is diametrically opposed to tie bar 88 and valve 74 and includes plug 91 which is threaded through valve block 11 and has a central bore within which is secured ball bushing 92 slidably receiving stop pin 93 whose inner end operatively engages the shoulder 94 upon the upper end of valve operator 40. Said pin has a shoulder 95 intermediate its ends, which is adapted to engage an interior wall of plug 91 for limiting inward movement of said pin under the action of coiled spring 97, which is retained within adjusting nut 96 threaded within plug 91 and secured in adjusted position by lock nut 98.

The outer end of pin 93 slidably extends through adjusting nut 96 and has the nuts 99 secured thereon whereby stop pin 93 may be manipulated or manually withdrawn, if desired.

This stop pin construction is protectively enclosed by the cap 100, which is threaded over plug 91 where it projects from valve block 11.

There is also provided a similar stop pin construction in conjunction with the valve within valve body 114, which is diametrically opposed from the valve and which includes the protective cover 115 shown in Fig. 2. However, additional explanation thereof is omitted as the construction of this stop pin is exactly the same as that above described in Fig. 1. Additionally, however, said stop pin also operatively engages shoulder 94 projecting from valve operator 40 at right angles to stop pin 93.

With the spindle out of contact with the template, the spring operated stops normally engage the valve operator so as to maintain the spindle in the axial upright position shown. Consequently, any deflection of the spindle will be against the action of stop springs 97 in one direction of tilting, and in the opposite direction of tilting will be against the action of spring 78.

Positioned below the two valve bodies 70 and 114, there are provided the four right angularly arranged solenoid housings 101, 102, 103 and 104, which are secured as at 105 to the tracer barrel 13. Within each of said housings there is provided a solenoid mechanism 106 secured to its respective housing as at 107, Fig. 1, and with each of said solenoid mechanisms including the normally retracted radially directed right angularly arranged plungers 101', 102', 103' and 104', whose inner ends are normally in spaced relation to spindle 24.

As diagrammatically shown in Fig. 3, there is provided a remote control panel 108 having a set of separately operable push buttons 109, 110, 111 and 112, respectively joined to the four solenoid control mechanisms 101, 102, 103 and 104.

By pressing one button the corresponding plunger of the solenoid mechanism will operatively engage the spindle upon one side and tilt the same in such direction as will effect a longitudinal movement of valve 74, for illustration. By operating a second push button the oppositely arranged plunger, such as plunger 102', will be projected inwardly for tilting the spindle in the opposite direction. This will effect a movement of valve 74 in the opposite direction.

Correspondingly a manual actuation of either of the buttons 111 or 112 will cause transverse tilting of the spindle in one of two directions.

Should the proper two buttons be simultaneously energized, and assuming the valves are connected to a pair of right angularly related cylinder controlled slides, there can be produced a 45 degree relative feed movement between both slides as these slides will be moved simultaneously and will thus produce a relative feed movement of a workpiece and template on said slides with respect to a cutter and the tracer contactor respectively along a 45 degree angle.

This particular manual control is useful whenever the tracer is out of contact with said template.

Operation

As an initial step in the operation of the present duplicating device, the D. C. magnetic coil 31 is connected by a suitable wire to a source of direct current to thereby magnetize the contactor of the tracer, such as contactor pin 113 at the lower end of the tracer spindle as shown in Fig. 1. The brass spindle element 25 forming a part of spindle 24 prevents the balance of the spindle from being magnetized.

When the machine is set up so that contactor 113 engages the profile of a template, the cutter employed will be engaging a corresponding portion of a workpiece. By magnetizing the contactor, during relative traversing movements, the contactor will stick to the profile of the metal template which is preferably steel.

The D. C. motor 64 is then energized from a direct current power source with a suitable rheostat interconnected for regulating the speed of rotation thereof. During the tracing operation the spindle 24 will be continuously rotated in one direction or the other inasmuch as the motor will have a control for regulating the direction of rotation. With rotation due to the frictional contact established between the tracer spindle and the template employed, there will be an automatic feed of the contactor 113 over the profile of the template. This continuous rotation will effect various positionings progressively of contactor 113 around the template profile. To accomplish feeding in the opposite direction, it is merely necessary to change the direction of rotation of motor drive shaft 63.

In the preferred embodiment and for illustration, motor 64 can be as small as 1/15 horsepower.

In view of the lateral tilting movements of the spindle about its ball bearing supports 16, it is necessary that the universal joints 48 and 49 be employed to assure continuous rotation of the spindle regardless of its tilting movements.

Having described my invention, reference should now be had to the claims which follow for determining the scope thereof.

I claim:

1. A tracer comprising an upright hollow housing, a template engaging spindle universally mounted intermediate its ends within said housing and projecting therefrom, power means joined to said spindle for rotating it, a reciprocal fluid control valve within said housing engageable with said spindle and responsive to tilting movements thereof, magnetic means on the end of said spindle for maintaining continuous contact of the spindle with a template whereby rotation thereof urges the spindle along the profile of said template, a pair of right angularly related solenoids mounted upon said housing, and a reciprocal plunger positioned in each solenoid with their axes in a plane at right angles to the spindle axis and with their inner ends normally spaced from said spindle, and adapted upon energization of at least one solenoid to operatively engage said spindle for tilting the same when said spindle is out of contact with said template.

2. A tracer comprising an upright hollow housing, a template engaging spindle universally mounted intermediate its ends within the lower end of said housing and projecting therefrom, power means joined to said spindle for rotating it, a non-rotatable valve operator loosely mounted in said spindle within the housing, a pair of horizontally disposed right angularly related reciprocal fluid control valves within said housing at right angles to the spindle axis, means respectively interconnecting said operator with each of said valves so that said valves are under positive control of said spindle during its rotation throughout all tilting movements thereof as it traverses the profile of a template, magnetic means upon one end of said spindle for maintaining continuous contact of said spindle with said template, whereby rotation thereof urges said spindle along the profile of said template, a plurality of right angularly related solenoids mounted upon said housing in the form of a cross, and a reciprocal plunger positioned in each solenoid with their axes in a plane at right angles to the spindle and with their inner ends normally spaced from said spindle, and adapted upon energization of at least one solenoid and of not more than two such solenoids at right angles to each other to operatively engage said spindle for tilting the same when said spindle is out of contact with said template.

3. The tracer of claim 2, a control panel remote from said tracer, and a plurality of manual push button switches corresponding to each of said solenoids and respectively joined thereto for selectively energizing the same.

4. A tracer comprising an upright hollow housing, a template engaging spindle universally mounted intermediate its ends within the lower end of said housing and projecting therefrom, power means joined to said spindle for rotating it, a non-rotatable valve operator loosely mounted on said spindle within the housing, resilient end thrust means on said operator retainingly engaging said spindle against relative axial movement in one direction, a pair of horizontally disposed right angularly related reciprocal liquid control valves within said housing at right angles to the spindle axis, means respectively interconnecting said operator with each of said valves so that said valves are under positive control of said spindle during its rotation throughout all tilting movements thereof as it traverses the profile of a template, magnetic means upon one end of said spindle for maintaining continuous contact of said spindle with said template, whereby rotation thereof urges said spindle along the profile of said template, portions of said housing adjacent each valve having respectively an inlet passage adapted for connection to a source of liquid under pressure, and a pair of outlet passages which, dependent upon movement of the corresponding valve, are adapted to selectively deliver said liquid under pressure to opposite ends alternately of slide controlling cylinders, said end thrust means including an annular shoulder on said valve operator, and a coiled compression spring loosely surrounding said operator bearing upon said shoulder at one end and with the other end of said spring engaging said housing for normally centering said spindle within said housing, the mounting of said valve operator including an axial support on the spindle, a bushing between said operator and said spindle supportably engaging said operator, and a thrust bearing on said axial support mounting said bushing, a spindle extension axial of said spindle, and universal joint couplings joining said extension at one end to said spindle and at its other end to said power means, whereby said spindle is universally tiltable during rotation thereof.

References Cited in the file of this patent

UNITED STATES PATENTS

| | | |
|---|---|---|
| 2,221,459 | Sassen | Nov. 12, 1940 |
| 2,239,625 | Roehm | Apr. 22, 1941 |
| 2,276,755 | Anderson | Mar. 17, 1942 |
| 2,433,005 | Turchan | Dec. 23, 1947 |
| 2,612,184 | Evans | Sept. 30, 1952 |
| 2,704,956 | Johnson | Mar. 29, 1955 |
| 2,745,624 | Turchan | May 15, 1956 |